United States Patent [19]
Kennedy

[11] Patent Number: 5,538,212
[45] Date of Patent: Jul. 23, 1996

[54] PORTABLE HANGING CAMERA SUPPORT MECHANISM

[76] Inventor: Thomas E. Kennedy, 2761 NE. 47th St., Lighthouse Point, Fla. 33064

[21] Appl. No.: 265,279

[22] Filed: Jul. 1, 1994

[51] Int. Cl.⁶ ........................................ A47K 1/00
[52] U.S. Cl. .................. 248/215; 248/248.1; 248/303; 354/81
[58] Field of Search .................. 248/214, 215, 248/227, 298, 303, 304, 317, 339, 340, 153, 175, 176, 177; 354/82, 81, 292, 293; 224/42

[56] References Cited

U.S. PATENT DOCUMENTS

| | | | |
|---|---|---|---|
| 4,437,753 | 3/1984 | Dunn | 354/293 |
| 4,526,308 | 7/1985 | Dovey | 354/82 X |
| 4,615,597 | 10/1986 | Burriss | 354/293 |
| 4,893,363 | 1/1990 | Huff | 4/496 |
| 4,943,820 | 7/1990 | Larock | 354/82 |
| 4,963,904 | 10/1990 | Lee | 354/82 |
| 5,326,058 | 7/1994 | Beaver et al. | 248/177 X |
| 5,332,136 | 7/1994 | Rudolph | 354/293 X |

*Primary Examiner*—Ramon O. Ramirez
*Attorney, Agent, or Firm*—Oltman and Flynn

[57] ABSTRACT

A support assembly for supporting a camera has a frame having an upper side, hooks on the upper side of the frame for hanging the frame on an object, a plate affixed to the upper side of the frame for supporting a camera, a vertical sleeve on the plate, and adjustable post in the sleeve adapted to receive the camera.

4 Claims, 5 Drawing Sheets

PORTABLE HANGING CAMERA SUPPORT MECHANISM

BACKGROUND OF THE INVENTION

This invention relates to the support of a variety of cameras by allowing the camera to be hung or suspended in position. It is adjustable Over a wide variety of positions for proper viewing angle and adapts to many cameras and camcorders.

In the past, most camera supports (that do not include human support) have evolved from tripods. Tripods were adequate for still pictures because the photographer needed to stand behind the camera and look through the view finder. Moving picture cameras and especially camcorders often need only to be positioned and then can be left unattended. This is especially true when the event being recorded is in one room or in one area such as a living room or tennis court. Camcorders allow a camera to be set up, the scene reviewed, adjustments made, and then left recording while unattended. This feature of camcorders is very desirable for photographers in that they can be part of the action, eliminating an additional person for recording.

Tripods allow this but they are large, bulky, take up a lot of floor space and are often in the way of the action being recorded.

It is also often desirable to position a camera on or against a wall or surface to get it out of the way and to open up the viewing area as much as possible. A tripod does not allow this.

SUMMARY OF THE INVENTION

The primary objective of this invention is to allow the user to hang a camera from many convenient objects including, but not limited to, fences, doors, drawers, chairs, mirrors, car windows, golf carts, towel bars, wires, ropes, tree branches, curtain rods, etc.

Another objective of this invention is to allow the user to conveniently stand the camera on any surface including, but not limited to, tables, desk, bureau, bench, ground, etc.

Another objective of this invention is to make it adjustable such that it will be useful in a wide variety of situations.

Another objective of this invention is to provide such a support system such that it will accommodate a wide variety of cameras.

Further objectives and advantages will become apparent from a consideration of the drawings and ensuing description of it.

DETAILED DESCRIPTION OF THE INVENTION

Figure 1:
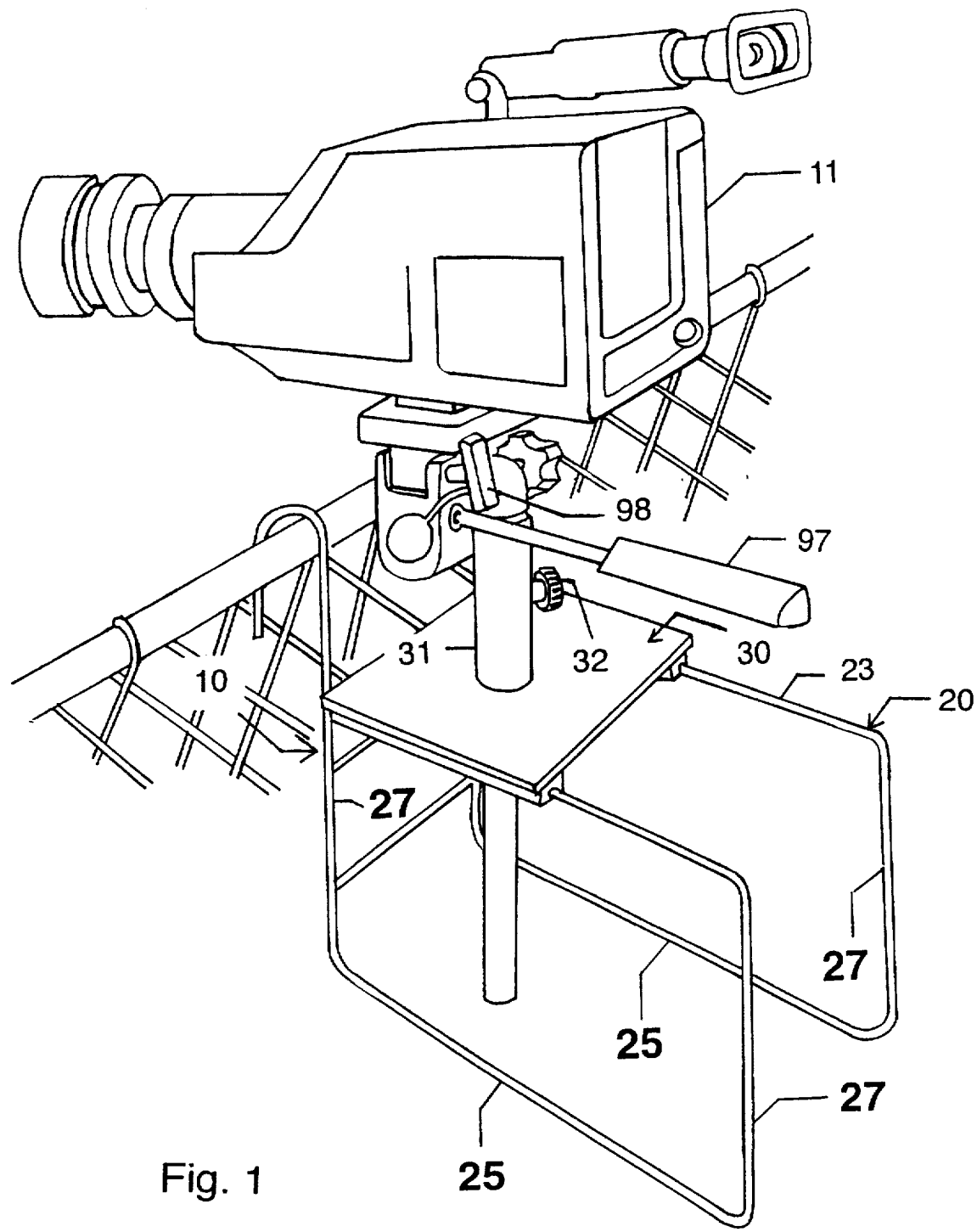
FIG. 1 is a perspective view of the complete camera support assembly in accordance with the present invention.

The hanging portable camera support mechanism is designated by the numeral 10 in FIG. 1. The present invention consists of a frame 20, a sliding deck 30, a vertical sleeve 31, a vertical adjustment slide 91, a camera mount adapter 92 and a camera mount 93.

The frame 20 is constructed of steel wire or the like. Each side is formed into a rectangle or triangle (rectangle shown) with a hook 21 formed at one end as shown in FIG. 2.

Figure 2:
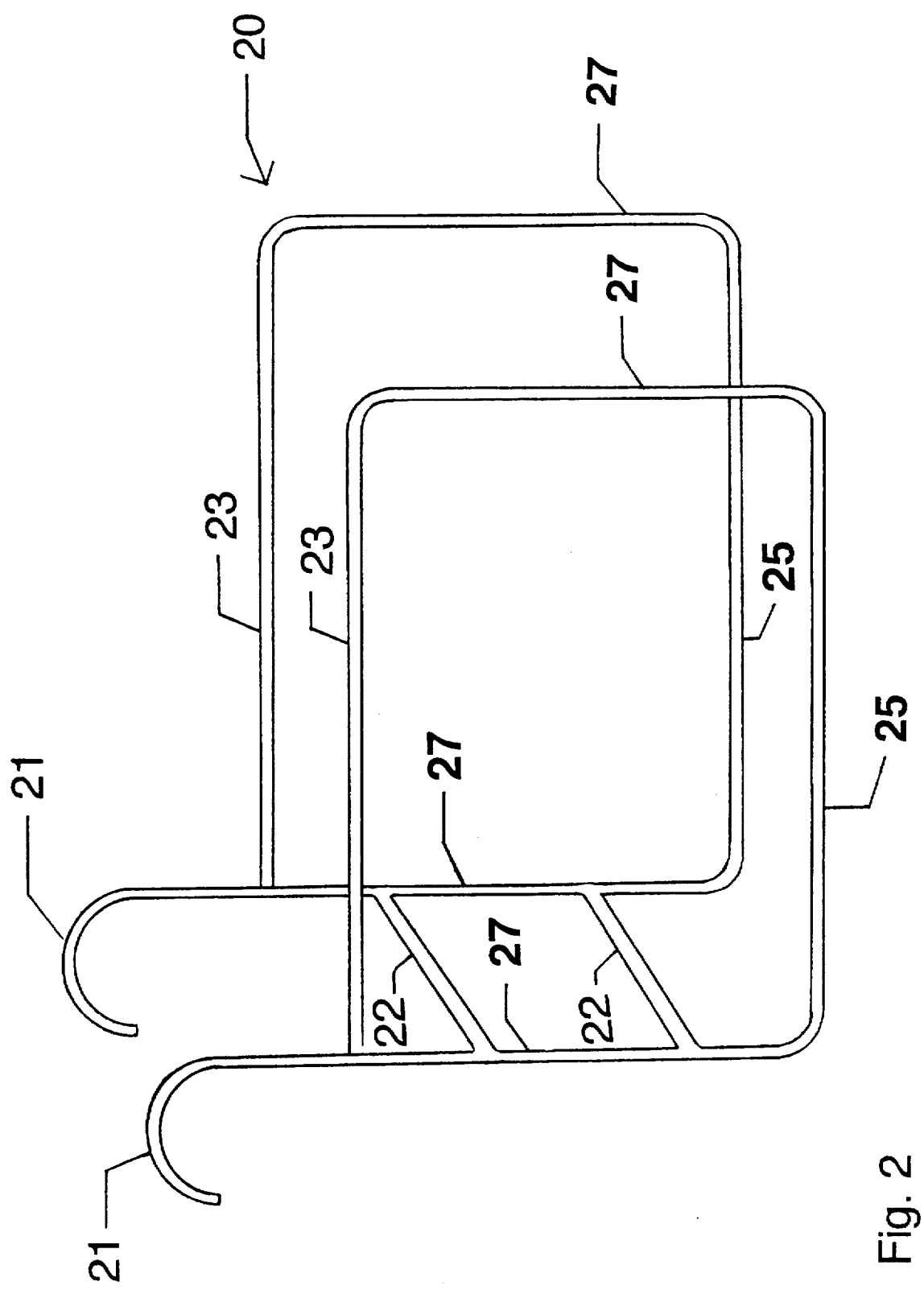
FIG. 2 is a perspective view of the frame in accordance with the present invention.

The side is made rigid by welding one end of the wire to a point somewhat below the hook 21 as shown in FIG. 2.

The frame 20 is made rigid by welding one or more cross pieces 22 to each side of the frame 20 thereby connecting one frame side to the other as shown in FIG. 2. The frame 20 has a horizontal bottom side 25 on which the frame 20 can optionally stand. The frame 20 has legs 27 on which frame 20 rests when standing.

The frame 20 is then painted to prevent corrosion and to provide a smooth sliding surface for the sliding deck 31 which slides on the sliding bars 23.

Figure 3:
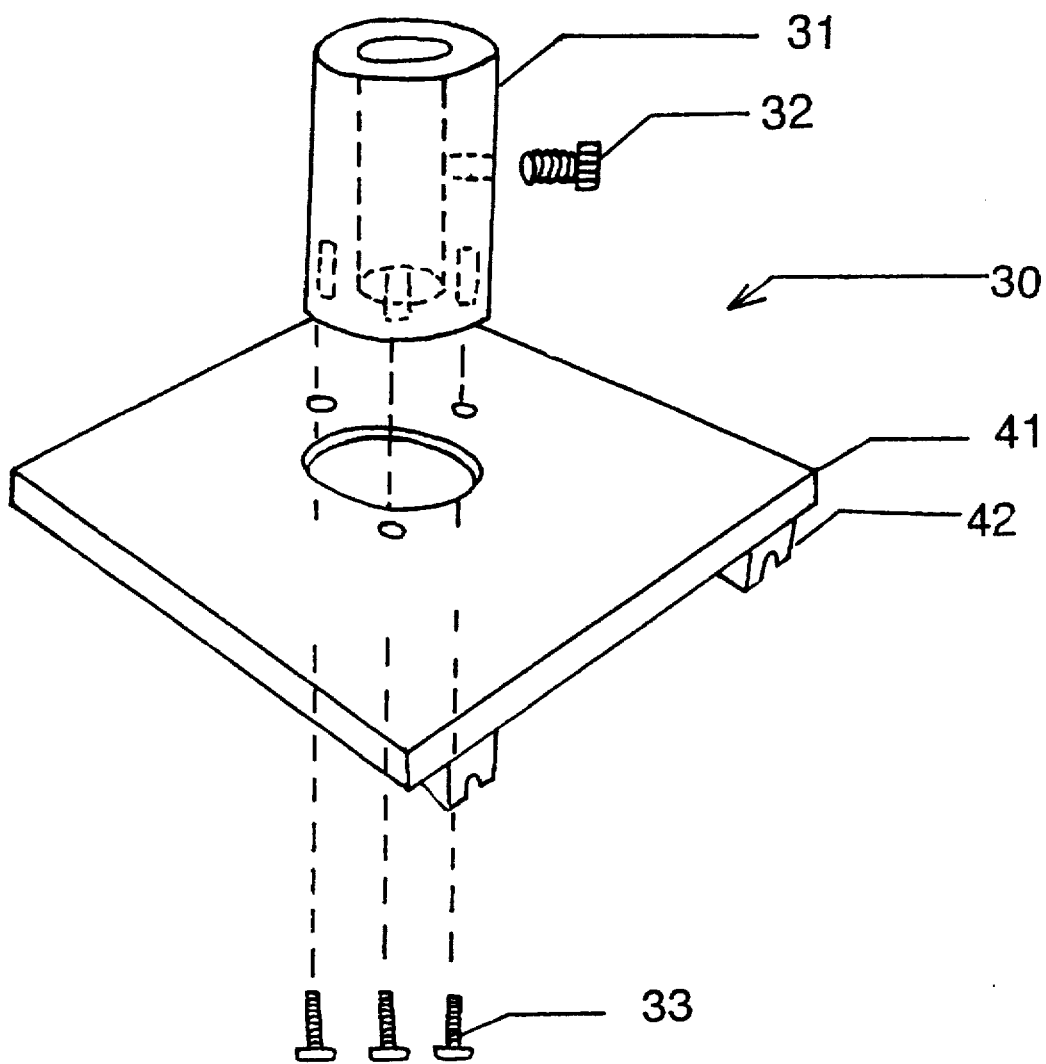
FIG. 3 is an exploded view of the sliding deck, vertical sleeve and slide stop screw assembly in accordance with the present invention.
Figure 6:
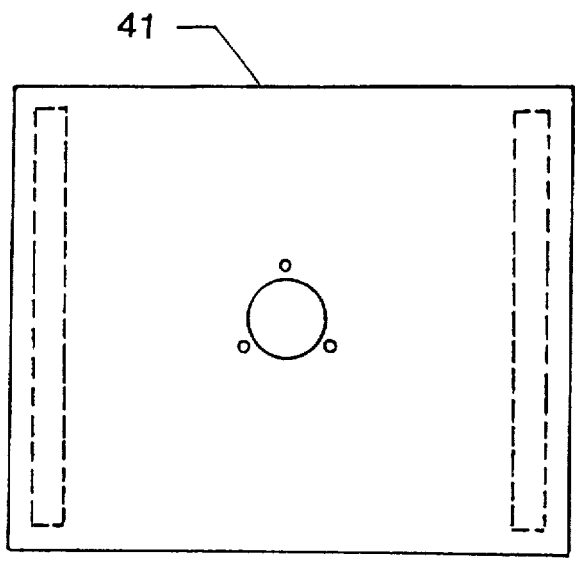
FIG. 6 is a top view of the deck plate in accordance with the present invention.
Figure 5:
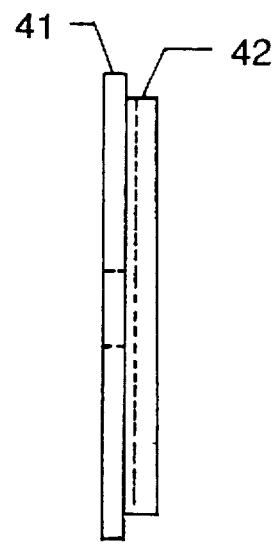
FIG. 5 is a side elevation view of the deck assembly in accordance with the present invention.
Figure 4:
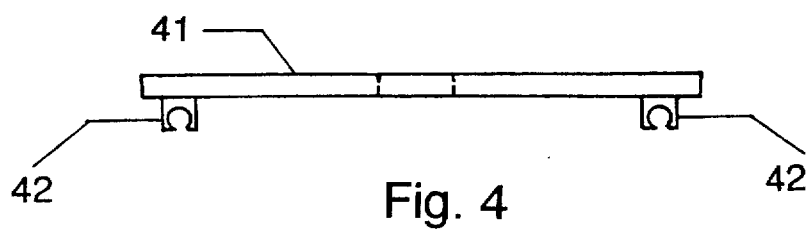
FIG. 4 is a front elevation view of the sliding deck assembly in accordance with the present invention.
Figure 7:
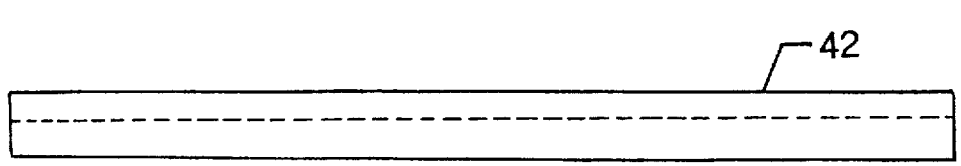
FIG. 7 is a side elevation of the frame clip in accordance with the present invention.
Figure 8:
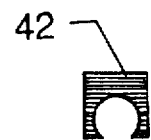
FIG. 8 is a cross section of the frame clip in accordance with the present invention.

The sliding deck 30 is an assembly consisting of a deck plate 41 and two frame clips 42, the vertical sleeve 31, the slide stop screw 32 and is shown in FIG. 3.

The deck plate 41 is constructed of a rigid acrylic plastic or the like and is rectangular in shape although other shapes may be used. It has one large hole drilled through it. The diameter of the hole is such that the vertical adjustment slide 91 can pass through it. A number of smaller holes are drilled on a circle slightly larger than the diameter of the large hole. These holes allow screw 33 to secure the vertical sleeve 31 to the deck plate 41 as shown in FIG. 3. The vertical sleeve 31 may be secured in any number of other ways, however.

The frame clips 42 are constructed of polyvinyl chloride or the like and are cut to a length slightly less than the length of the deck plate 41. The cross section of the frame clip 42 is such that it will snap over the frame slide bar 23. The frame clip 42 will firmly grip the frame slide bar 23 yet still allow movement when forced along the frame slide bar 23.

The frame clips 42 are glued to the deck plate 41 using Weld-On™ 52 adhesive and are clamped under pressure to form a tight bond.

The sliding deck 30 is snapped onto the frame as shown in FIG. 1.

The vertical sleeve 31 is constructed of polyvinyl chloride tubing or the like. The inside diameter is such that it is large enough to allow the vertical adjustment slide 91 to move freely up and down but not so large as to allow the vertical adjustment slide 91 to wobble along its axis. The vertical sleeve 31 has a number of small holes drilled into one end of it so that a number of screws 33 can be used to attach it to the deck plate 41 as shown in FIG. 3. Other methods may be employed to attach the vertical sleeve 31 to the deck plate 41, however.

The vertical sleeve 31 has a threaded hole drilled through one wall perpendicular to its axis. This hole is threaded such that it will accept the slide stop screw 32 as shown in FIG. 3.

The slide stop screw 32 is constructed of nylon plastic or the like and is threaded such that it will screw into the vertical sleeve 31 as shown in FIG. 3.

Figure 9:
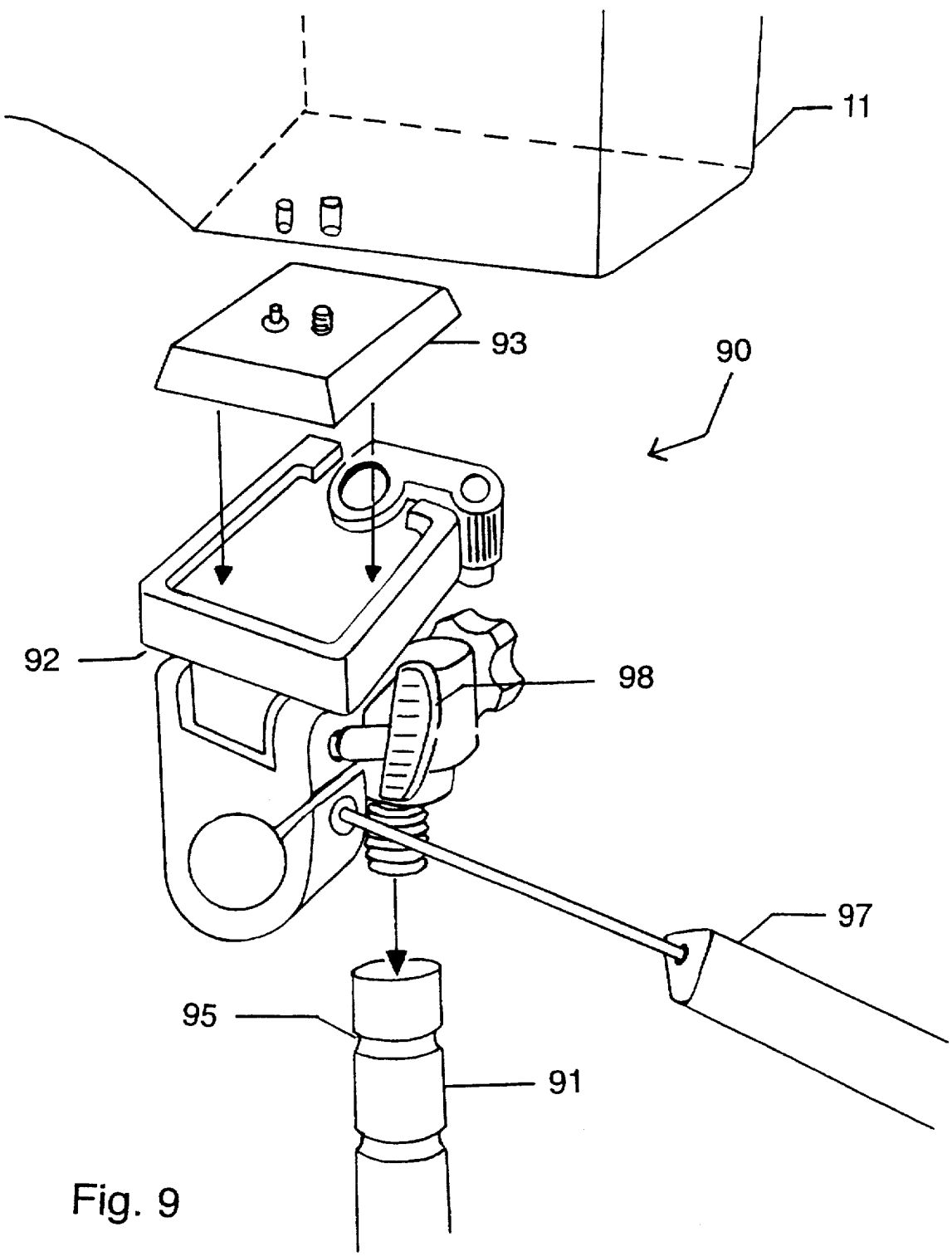
FIG. 9 is an exploded view of the vertical adjustment slide camera mount adapter and camera mount in accordance with the present invention.

The camera mount assembly 90 consists of the vertical adjustment slide 91, the camera mount adapter 92, the universal camera mount 93 and is shown in FIG. 9.

The vertical adjustment slide 91 is constructed of aluminum tubing or the like. It has a number of grooves 95 cut into the tubing at regular intervals. The distance between grooves 95 (center to center) is the same as the distance from the center of the threaded hole in the vertical sleeve 31 to the top of the vertical sleeve 31.

The vertical adjustment slide 91 is threaded on the inside at the top as shown in FIG. 9. The camera mount adapter 92 is then screwed into the top of the vertical adjustment slide 91 as shown in FIG. 9. Other methods of attachment may be used, however.

The vertical adjustment slide 91 is anodized to provide corrosion protection and to provide a pleasing appearance.

The grooves 95 are cut into the vertical adjustment slide 91 after it is anodized. This provides a color contrast that is useful in the operation of the device but is not necessary to its operation.

The universal camera mount 93 then attaches to the camera mount adapter 92 as shown in FIG. 9. Other means of attachment may be used, however.

The camera mount assembly 90 is then inserted into the vertical sleeve 31 and the slide stop screw 32 is lightly tightened to secure it into place, as shown in FIG. 1.

The camera is attached to the universal camera mount 93 as shown in FIG. 9. Other methods of attachment may be used, however.

USE OF THE INVENTION

The portable hanging camera support mechanism 10 is typically used by hanging it as shown in FIG. 1. It is usually installed on a structure that is thin enough so that the hooks 21 on the frame 20 can "hook" over the structure. The structure can take many forms and includes, but is not limited to, a fence, door, chair, drawer, wire, rope, rod, bar, chain, etc.

The camera 11 shown in FIG. 1 can be turned in any direction around the axis of the vertical adjustment slide 91. This is done by first loosening the slide stop screw 32 and rotating the camera about the axis of the vertical adjustment slide 91, then tightening the slide stop screw 32 after the correct rotation has been set.

The camera 11 height can be adjusted by loosening the slide stop screw 32 and raising the camera 11 and vertical adjustment slide 91 to the desired position and then tightening the slide stop screw 32. This is best accomplished by raising the camera 11 and vertical adjustment slide 91 such that the middle of one of the grooves 95 in the vertical adjustment slide 91 is flush with the top of the vertical sleeve 31. This will center the slide stop screw 32 in the next lower groove 95. If the slide stop screw 32 is loosely tightened in this position the camera 11 and vertical adjustment slide 91 will stay in the proper vertical position but can still be rotated about the axis of the vertical adjustment slide 91.

The camera lens can be raised or lowered by rotating the camera about the horizontal axis of the camera mount adapter 92. First loosen the angle screw 97, set the angle to the desired position and then tighten the angle screw 97 to hold it in position.

The camera 11 can be rotated left to right (when viewed from the rear of the camera) by loosening the rotation screw 98, adjusting the desired position and then tightening the horizontal rotation screw 98.

The camera 11 can also be moved back and forth along the sliding bars 23. This is especially useful if the portable hanging camera support mechanism 10 is hung on the back of a chain link fence. This allows the cameras of various lengths to be positioned such that the lens is centered in one of the fence links and very close to the fence. This provides an unobstructed view of the field of play (e.g. baseball game) while the fence provides protection from errant objects (e.g. baseballs).

The portable hanging camera support mechanism 10 can also be used to provide a stable platform when it stands (not hung) on any horizontal (or nearly so) surface. This allows it to stand on many surfaces such as, but not limited to, a table, desk, bench, ground, etc.

The camera mount 93 is constructed such that it will screw into many different cameras. Most cameras, including still cameras and camcorders of all styles, have the same standard mounting mechanism on their bottom. This usually consists of a threaded hole or a threaded hole and pin configuration.

It is to be understood that materials other than steel, aluminum and plastic may be employed in the construction of the portable hanging camera support mechanism. Other methods of attachment of parts and assemblies may also be used. Various changes and modifications may be made within this invention as will be apparent to those skilled in the art. Such changes and modifications are within the scope and teaching of this invention as defined in the claims appended hereto.

I claim:

1. A support assembly for supporting a camera, comprising:

a frame having an upper side, hooks affixed to the upper side of said frame for hanging said frame on an object, plate means affixed to said upper side of said frame for supporting a camera, a vertical sleeve on said plate means, and an adjustable post in said sleeve adapted to receive the camera, said frame bar has a horizontal bottom side on which said frame can optionally stand, said frame is a wire frame, said frame has legs on which said frame rests when standing.

2. A support assembly for supporting a camera, comprising:

a frame having an upper side, hooks affixed to the upper side of said frame for hanging said frame on an object, plate means affixed to said Upper side of said frame for supporting a camera, a vertical sleeve on said plate means, and an adjustable post in said sleeve adapted to receive the camera, wherein said plate means has clips for securing the same to said frame and for allowing said plate means to move horizontally on said frame.

3. The support assembly of claim 2 in which:

said frame is a wire frame and said clips snap onto said wire frame.

4. The support assembly of claim 3 in which:

said hooks are vertical extensions of said wire frame.

* * * * *